May 17, 1966  H. EHLERS ETAL  3,251,173
DEVICE FOR THE PURIFICATION OF HYDROGEN
Filed Nov. 26, 1963
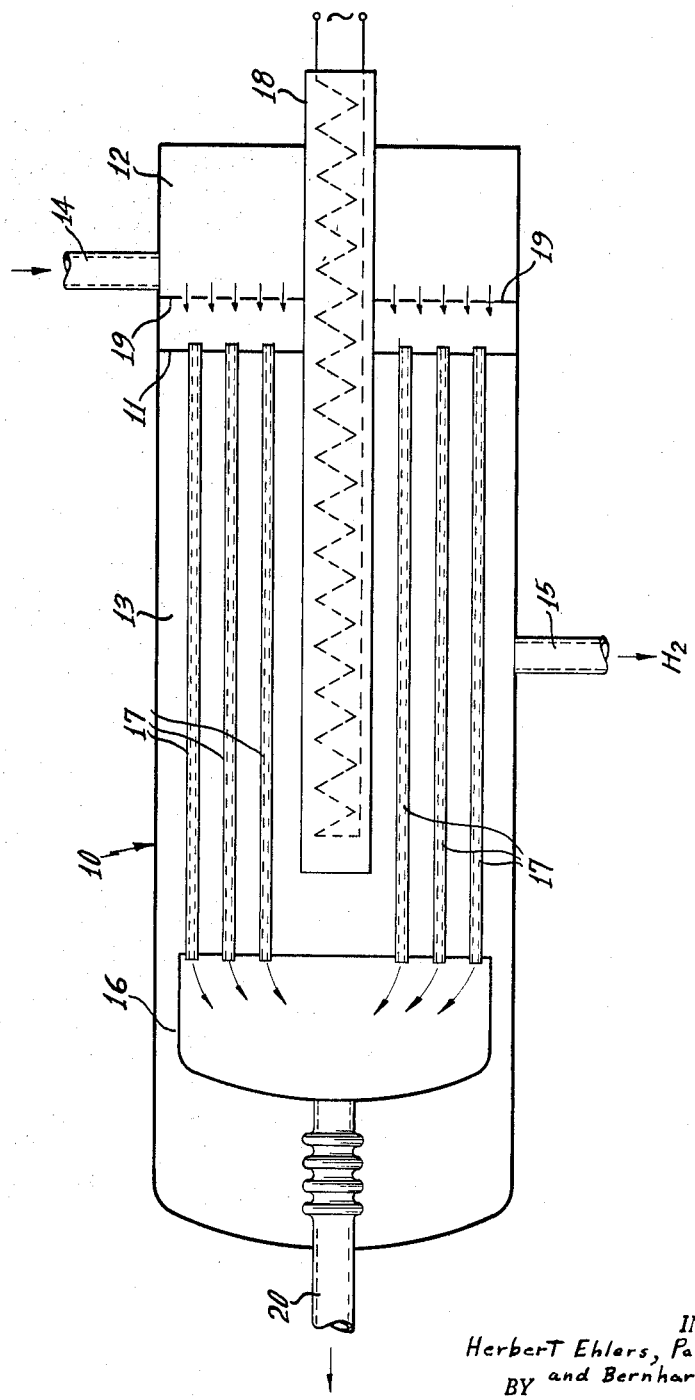
INVENTORS:
Herbert Ehlers, Paul Müller
BY and Bernhard Rosenstock
John K. Conant
ATTORNEY

… …

United States Patent Office 3,251,173
Patented May 17, 1966

---

3,251,173
DEVICE FOR THE PURIFICATION OF HYDROGEN
Herbert Ehlers, Hohe Tanne, near Hanau am Main, Paul Müller, Ostheim, near Hanau am Main, and Bernhard Rosenstock, Hanau am Main, Germany, assignors to W. C. Heraeus Gesellschaft mit beschränkter Haftung, Hanau am Main, Germany
Filed Nov. 26, 1963, Ser. No. 325,966
Claims priority, application Germany, Nov. 26, 1962, H 47,506
2 Claims. (Cl. 55—158)

This invention is a device for the purification of hydrogen, and particularly for separating hydrogen from gas mixtures which contain considerable quantities of other gases besides hydrogen. The device utilizes the long known qualities of the metals of the VIII group of the periodic system (palladium, for example) to be permeable for hydrogen, but not other gases. Therefore only the hydrogen permeates the metal and diffuses through it.

Devices known for the separation of hydrogen from gas mixtures by diffusion can be placed in two groups, namely those which use foils or films of hydrogen permeable metals on porous carriers and those which have diffusion tubes of hydrogen permeable metal. In both types the purification process is carried out by applying heat and pressure.

The foils or films on porous carriers have the great disadvantage that they are not resistant to mechanical stress and are easily broken, especially at higher pressures. The metal diffusion tubes withstand stress better.

The device of this invention is of the type having diffusion tubes of hydrogen permeable metal.

It is an object of the invention to provide an improved construction including heating means to preheat the impure gas and heat the diffusion tubes.

An additional object is to provide a novel construction to permit longitudinal expansion of the diffusion tubes so that they will not buckle and break when heat and pressure is applied.

The device in accordance with the invention comprises an outer tank with a wall across the inside of the tank to divide it into a first and second chamber. An inner tank is in the second chamber and the diffusion tubes are supported in the second chamber between the wall and the inner tank so as to open into the first chamber at one end and into the inner tank at the other. A heating element extends through the wall into both the first and second chamber and the diffusion tubes are arranged concentrically around the heating element in the second chamber. An inlet for impure gas is provided through the outer tank wall into the first chamber. The heating element preheats the impure gas in the first chamber and heats the tubes in the second chamber.

A perforated baffle plate in the first chamber improves the circulation of impure gas into the diffusion tubes. As the impure gas flows through the tube toward the inner tank, hydrogen permeates the tube walls and diffuses into the second chamber from which it flows out a suitable outlet.

The residue gas flows into the inner tank which is provided with an outlet conduit to the outside of the outer tank. The outlet conduit is flexible and longitudinally extensible and compressible so that the inner tank is free to move as the diffusion tubes expand and contract and relieve stress on the tubes which might otherwise buckle and break.

An example of the form of construction of the device in accordance with the invention is shown in the accompanying drawing which is a side view of a longitudinal section through the device.

Referring to the drawing, an outer tank 10 is divided by a wall 11 into a first chamber 12 and a second chamber 13. An inlet 14 for impure gas containing hydrogen opens into the first chamber 12. An outlet 15 is provided through the side of the outer tank 10 for purified hydrogen from the second chamber 13.

Within the second chamber 13 is an inner tank 16. A plurality of diffusion tubes 17 of hydrogen permeable metal, such as palladium or palladium alloyed with 20–35% silver or with 2–8% gold, are supported in the second chamber 13 between the wall 11 and inner tank 16. As shown in the drawing the tubes 17 are open ended and open into the first chamber 12 at one end and into the inner tank 16 at the other.

A cylindrical electric resistance heating element 18 extends through an end of the outer tank 10, through the first chamber 12, through the wall 11 and into the second chamber 13.

Within the chamber 13 the diffusion tubes 17 are arranged concentrically around the heating element 18 so as to make the most effective use of the heat supplied. The tubes shown are straight but it will be understood they may also be spirally wound around the heating element 18.

A perforated baffle plate 19 is arranged in the first chamber 12 to extend generally perpendicularly into the flow of impure gas from the inlet 14 to the diffusion tubes 17 so as to cause the impure gas to circulate evenly into the tubes 17.

The inner tank 16 is provided with an outlet conduit 20 through a portion of the second chamber and out through an end wall of the outer tank 10. The outlet conduit 20 is made of a flexible metal accordion pleated tube so as to be flexible and longitudinally extensible and compressible and permit the inner tank 16 to move and relieve stress on the tubes 17 when the tubes expand and contract.

In operation the impure gas containing hydrogen is fed through the inlet 14 under pressure into the first chamber 12 where it is preheated by the heating element 18. The gas flows through the perforated baffle plate 19 and into the diffusion tubes 17. Hydrogen in the gas permeates the walls of the tubes and diffuses into the second chamber 13 from which it flows through the outlet 15 to storage facilities or to the point of use. The remaining gas continues through the tube into the inner tank 16 from which it flows out the outlet conduit 20.

The tanks 10 and 16, the inlet 14 and the outlets 15 and 20 may suitably be made of stainless steel.

What is claimed is:
1. A device for the purification of hydrogen comprising an outer tank, a wall across the inside of the outer tank dividing it into a first chamber and a second chamber, said outer tank having an inlet for impure gas into the first chamber and an outlet for hydrogen from the second chamber, an inner tank in the second chamber of the outer tank, a heating element through said wall and extending into both the first and second chambers, a plurality of open ended tubes of hydrogen permeable metal arranged concentrically around said heating element in the second chamber, said tubes having one end secured to said wall and opening into the first chamber and the other end secured to and opening into the inner tank, and an outlet conduit from the inner tank through a portion of the second chamber to the outside of the outer tank, the outlet conduit being flexible, longitudinally extensible and compressible.

2. A device as set forth in claim 1 including a perforated baffle plate in the first chamber between the inlet and the ends of the diffusion tubes which open into the first chamber, said baffle plate being arranged to extend generally perpendicularly into the flow of impure gas from the inlet to the diffusion tubes.

References Cited by the Examiner

UNITED STATES PATENTS 3,104,960 9/1963 Chamberlin et al. ---- 55—158

FOREIGN PATENTS 1,178,480 12/1958 France.

REUBEN FRIEDMAN, *Primary Examiner.*

J. ADEE, *Assistant Examiner.*